ns Patent [19]

Trapasso

[11] 3,962,332
[45] June 8, 1976

[54] BIS-QUATERNARY AMMONIUM COMPOUNDS AND POLYMERS
[75] Inventor: Louis E. Trapasso, Watchung, N.J.
[73] Assignee: Celanese Corporation, New York, N.Y.
[22] Filed: Dec. 11, 1974
[21] Appl. No.: 531,577

[52] U.S. Cl............................ 260/561 N; 162/138; 162/158; 210/54; 260/567.6 P
[51] Int. Cl.$^2$........................................ C07C 103/44
[58] Field of Search .................. 260/561 N, 567.6 P

[56] References Cited
UNITED STATES PATENTS
3,170,901   2/1965   Melamed et al................ 260/561 N
3,632,623   1/1972   Becke et al..................... 260/561 N Primary Examiner—C. Davis

[57] ABSTRACT

This invention relates to di-olefinically unsaturated compounds which contain two quaternary ammonium moieties. Polymers and copolymers of these polyfunctional compounds are characterized by high charge density, and find application as flocculants, paper sizes, and electroconductive coatings.

1 Claim, No Drawings

BIS-QUATERNARY AMMONIUM COMPOUNDS AND POLYMERS

DESCRIPTION OF THE INVENTION

In one of its embodiments this invention provides a class of organic compounds which correspond to the formula:

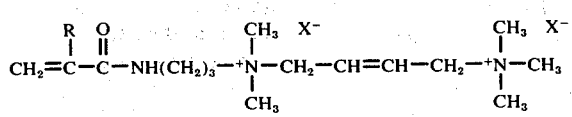

wherein R is hydrogen or methyl, and X is an anion.

In one method the above defined class of unsaturated quaternary organic compounds can be synthesized by reacting a 4-halo-2-butenyl trimethylammonium halide (e.g., chloride, bromide, fluoride or iodide) with dimethylaminopropylacrylamide or with dimethylaminopropylmethacrylamide.

The synthesis can be conducted conveniently by dissolving the reactants in water or other inert solvent such as methanol, butanol, benzene, toluene, acetonitrile, dimethylformamide, tetrahydrofuran, acetone, dioxane, and the like. Preferably the reaction mixture is heated at a temperature in the range from about 40°C. up to the refluxing temperature of the reaction mixture. The time of reaction varies between several minutes and several hours depending mainly on the reaction temperature. The reactants are usually employed in approximately equimolar proportions. It is advantageous to maintain the pH of the system at about 7 so as to prevent hydrolysis of amido group in the compounds. It is a particular advantage of the present invention compounds that they do not contain easily hydrolyzable ester groups.

By the method of synthesis described above, there are produced compounds of structural formula I in which the anions are of the halide type. These anions can be replaced with other anions by contacting the quaternary halides with an appropriate ion exchange resin. Typical anions include hydroxide, nitrate, sulfate, sodium acid sulfate, chromate, phosphate, methyl sulfate, acetate, formate, oxalate, sulfamate, acrylate, and the like.

The unsaturated bis-quaternary compounds of the present invention are readily polymerizable, and the aqueous solutions resulting from the above described synthesis can be employed directly for this purpose. Any known polymerization initiator of the free radical type may be selected for use, such as t-butyl hydroperoxide, ammonium persulfate and alkali metal persulfates. The initiator is usually effective in quantities between about 0.1% and 5% by weight, based on the weight of the unsaturated bis-quaternary compound. A redox initiator system can be provided by including a reducing agent such as sodium hydrosulfite in the initiator system.

These new unsaturated bis-quaternary compounds can be copolymerized with other polymerizable olefinically unsaturated monomers, preferably in aqueous solution and emulsion polymerization systems with redox initiation. Highly preferred copolymers of the present invention, which exhibit outstanding properties for application as flocculants and electroconductive aids, are those comprising acrylamide copolymerized with an unsaturated bis-quaternary compound of structural formula I.

An alternative method for producing the invention copolymers is by reacting a polymerizable monomer such as acrylamide with dimethylaminopropylacrylamide or with dimethylaminopropylmethacrylamide. The copolymer so produced is then quaternized by reaction with 4-halo-2-butenyl trimethylammonium halide.

The copolymers can contain between about 0.1% and 95% of a comonomer such as acrylamide. However, the preferred range for most applications is limited to about 5% and 70% of a comonomer, where water-solubility and high charge densities are controlling factors and require the presence of a high population of quaternary groups in the copolymers.

The polymers and copolymers of the present invention are viscous to solid resinous materials of water-soluble character. They are generally also partially soluble or dispersible in polar organic solvents such as methanol, acetonitrile, tetrahydrofuran and the like. The molecular weight of the polymers is in the range from about 20,000 to 2,000,000, and preferably, the molecular weight is at least 500,000.

It is an important feature of the present invention polymer and copolymers that they do not contain ester linkages, and therefore exhibit outstanding resistance to hydrolysis and chemical degradation. The polymer and copolymers are therefore versatile in a wide range of applications under extreme conditions of temperature and chemical environment.

A polymeric composition of the present invention can be incorporated into paper pulp to render it electroconductive for the production of paper stock for electrostatic image reproduction systems. A quantity of between about 0.1% and 10% by weight of the polymer, based on dry fiber weight, can be added to the wood pulp. Pigments and other additives known and used in the paper art can be included.

The polymeric compositions of the present invention are suitable for application for paper sizing and as wet strength agents. Copolymers containing between 0.1% and 20% by weight of bis-quaternary compounds of the structural formula I are useful for forming films and coatings having resistance to development of electrostatic charges.

The water-soluble polymeric compositions are generally useful as flocculants, particularly the polymeric compositions containing at least 60% by weight of the bis-quaternary compounds of structural formula I. The addition of between about 0.01% and 10% by weight of polymer, based on the weight of suspended solids (e.g., sewage sludge or paper pulp effluent) serves to flocculate the suspended matter and facilitate filtration procedures.

The following examples are further illustrative of the present invention. The reactants and other specific ingredients are presented as being typical, and various modifications can be devised in view of the foregoing disclosure within the scope of the invention.

EXAMPLE 1

4-Chloro-2-butenyl Trimethylammmonium Chloride

A reaction flask is charged with 300 ml. of acetone and 125 grams of 1,4-dichloro-2-butene. To the mixture is added 59 grams of trimethylamine gas, while maintaining the temperature at 25°C. After standing for several hours, the reaction mixture is filtered to recover the product as a white solid precipitate.

EXAMPLE 2

Dimethyl Acrylamidopropyl 4-Trimethylammoniumbuten-2-yl Ammonium Chloride Polymer A mixture of 20 grams of 4-chloro-2-butenyl trimethylammonium chloride, 16 grams of dimethylaminopropylacrylamide and 100 ml. of water is charged to a reaction flask, and the mixture is heated at 70°C for 5 hours.

The polymerization is initiated by the addition of 1 ml. of 0.1% solution of ferrous sulfate, 0.5 gram of ammonium persulfate and 0.5 gram of sodium hydrosulfite. The temperature is maintained at 70°C. for 1 hour, and then at 85°C. for another hour. The polymeric solution so obtained after cooling to 25°C. has a solids content of about 30%.

EXAMPLE 3

Dimethyl Methacrylamidopropyl 4-Trimethylammoniumbuten-2-yl Ammonium Chloride Copolymer With Acrylamide A reaction flask is fitted with several addition funnels. The flask is charged with 600 ml. of water and 2 ml. of 0.1% ferrous sulfate solution and heated to 70°C.

The addition funnels are charged, respectively, with (a) 2.0 grams and 50 ml. of water; (b) 2.0 grams of sodium metasulfite and 50 ml. of water; (c) a monomer mixture of 100 grams acrylamide and 100 grams of dimethylaminopropylmethacrylamide; and (d) 75 ml. of 37% hydrochloric acid. The solutions from all of the addition funnels are added dropwise over a period of 1 hour, with the temperature maintained at 70°C. After the reaction is completed the polymer solution has a solids content of about 20%.

A 300 gram portion of the polymer solution is diluted with 75 ml. of water and the pH is adjusted to 7 with sodium hydroxide. The pH is maintained at 7 while 40 grams of 4-chloro-2-butenyl trimethylammonium chloride is added to the polymer solution to yield the final high density charge bis-quaternized copolymer.

EXAMPLE 4

Treatment Of Sewage Sludge

The polymer solutions of Examples 2 and 3 are introduced into separate portions of a digested sewage sludge containing 10 grams of suspended matter of predominately organic composition per 100 ml. volume and having a pH of 7.5. The amount of polymer solution introduced provides 0.25 gram of polymer solids per 100 grams of suspended solids in the sewage sludge. The suspended matter is rapidly flocculated, and the speed of filtration of the sludge is enhanced.

EXAMPLE 5

Treatment Of Paper Mill Effluent

Paper mill effluent containing a colloid of paper fines is separated into 200 ml. samples. Each of the samples is treated with one of the polymer solutions of Examples 2 and 3. The suspended fines are flocculated in each case, and the filtration rate of the treated samples is several times higher than untreated samples.

What is claimed is:

1. A composition of the formula:

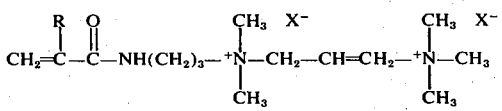

wherein R is hydrogen or methyl, and X is an anion.